(12) United States Patent
Schenk et al.

(10) Patent No.: US 12,123,981 B2
(45) Date of Patent: Oct. 22, 2024

(54) METHOD FOR OPERATING AN OPTOELECTRONIC DETECTION DEVICE, AND OPTOELECTRONIC DETECTION DEVICE

(71) Applicant: Valeo Schalter und Sensoren GmbH, Bietigheim-Bissingen (DE)

(72) Inventors: Jochen Schenk, Bietigheim-Bissingen (DE); Michael Kleiser, Bietigheim-Bissingen (DE); Jürgen Nies, Bietigheim-Bissingen (DE); Frank Selbmann, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 437 days.

(21) Appl. No.: 17/636,294

(22) PCT Filed: Aug. 4, 2020

(86) PCT No.: PCT/EP2020/071853
§ 371 (c)(1),
(2) Date: Feb. 17, 2022

(87) PCT Pub. No.: WO2021/032463
PCT Pub. Date: Feb. 25, 2021

(65) Prior Publication Data
US 2022/0299611 A1     Sep. 22, 2022

(30) Foreign Application Priority Data

Aug. 22, 2019   (DE) ..................... 10 2019 122 566.3

(51) Int. Cl.
*G01S 7/48*          (2006.01)
*G01S 7/4863*        (2020.01)
(Continued)

(52) U.S. Cl.
CPC .......... *G01S 7/4865* (2013.01); *G01S 7/4863* (2013.01); *G01S 7/497* (2013.01); *G01S 17/10* (2013.01)

(58) Field of Classification Search
CPC ...... G01S 7/4865; G01S 7/4836; G01S 7/497; G01S 17/10
(Continued)

(56) References Cited

U.S. PATENT DOCUMENTS

| 10,061,019 B1 | 8/2018 | Campbell et al. |
| 2019/0086540 A1 | 3/2019 | Park et al. |

FOREIGN PATENT DOCUMENTS

| DE | 102017127922 A1 | 5/2019 |
| EP | 1876469 A1 | 1/2008 |

(Continued)

OTHER PUBLICATIONS

International Search Report and Written Opinion issued in corresponding International Patent Application No. PCT/ EP2020/ 071853, mailed on Nov. 19, 2020 (11 pages).
(Continued)

*Primary Examiner* — Joel Ajayi
(74) *Attorney, Agent, or Firm* — Osha Bergman Watanabe & Burton LLP

(57) ABSTRACT

The invention relates to a method for operating an optoelectronic detection device (12) for monitoring at least one monitoring region (14) with optical monitoring signals (34), and to an optoelectronic detection device (12). In the method, at least one first receive start signal (58*a*) is sent to at least one first receiver (24*a*), and at least one second receive start signal (58*b*) is sent to at least one second receiver (24*b*). In response to the at least one first receive start signal (58*a*), a receive process which is carried out with the at least one first receiver (24*a*) is started and at least one first trigger signal (44*a*) is generated with the at least one first receiver (24*a*). In response to the at least one second receive start signal (58*b*), a receive process which is carried out with the at least one second receiver (24*b*) is started and at least one second trigger signal (44*b*) is generated with the at least one second receiver (24*b*). From the at least one first trigger signal (44*a*) and the at least one second trigger signal (44*b*), a transmission trigger signal (64) is determined, which corresponds to the later of the at least two trigger signals (44*a*, 44*b*) at least in terms of its trigger function. In response to the transmission trigger signal (64), at least one
(Continued)

optical monitoring signal (34) is generated with at least one optical transmitter (22).

14 Claims, 3 Drawing Sheets

(51) Int. Cl.
   *G01S 7/4865* (2020.01)
   *G01S 7/497* (2006.01)
   *G01S 17/10* (2020.01)
(58) Field of Classification Search
   USPC .................................................. 455/456.1
   See application file for complete search history.

(56) References Cited

FOREIGN PATENT DOCUMENTS

| | | | |
|---|---|---|---|
| EP | 2955539 | A1 | 12/2015 |
| WO | 2019/101990 | A1 | 5/2019 |

OTHER PUBLICATIONS

Search Report issued in corresponding German Patent Application No. 10 2019 122 566.3, dated Feb. 20, 2020 (9 pages).

METHOD FOR OPERATING AN OPTOELECTRONIC DETECTION DEVICE, AND OPTOELECTRONIC DETECTION DEVICE

TECHNICAL FIELD

The invention relates to a method for operating an optoelectronic detection device for monitoring at least one monitoring region with optical monitoring signals, wherein
  at least one reception start signal is communicated to at least one optical receiving unit,
  by means of the at least one receiving unit in response to the at least one reception start signal, a reception process is started and at least one trigger signal is generated,
  in response to at least one trigger signal directly or indirectly by means of at least one optical transmitting unit, at least one optical monitoring signal is generated and transmitted into the at least one monitoring region,
  reflection monitoring signals originating from monitoring signals reflected in the at least one monitoring region are received by the at least one optical receiving unit.

Furthermore, the invention relates to an optoelectronic detection device for monitoring at least one monitoring region with optical monitoring signals, wherein the detection device has
  at least one optical transmitting unit for generating optical monitoring signals,
  at least one optical receiving unit for receiving optical reflection monitoring signals originating from optical monitoring signals reflected in the at least one monitoring region,
  and at least one electronic control and evaluation unit which can control the detection device and can evaluate information about the monitoring region detected by the detection device,
  wherein the control and evaluation unit is connected to the at least one receiving unit and the at least one transmitting unit at least in terms of signaling,
  wherein the control and evaluation unit has at least one start signal generating means for generating reception start signals for at least one receiving unit,
  wherein at least one receiving unit has at least one trigger signal generating means for generating trigger signals,
  wherein the at least one receiving unit has at least one conversion means for converting optical reflection monitoring signals into signals that can be processed by the control and evaluation unit,
  and wherein the at least one optical transmitting unit has at least one light source which can generate optical monitoring signals.

PRIOR ART

DE 10 2017 127 922 A1 discloses an optoelectronic detection device with at least one optical transmitting unit with an electromagnetic pulse generator for emitting electromagnetic transmission pulses, and at least one optical receiver for receiving reflected transmission pulses that provides a reception signal range, formed depending on the reflected transmission pulse, to an evaluation device, wherein the optical receiver is configured to provide a trigger signal for the control of the optical transmitter. In one exemplary embodiment, a start signal is emitted to the receiver by an FPGA and at the same time two TDCs for a trigger signal and a feedback signal are started. The receiver passes the trigger signal on to the optical transmitting unit. The time from the start signal to the trigger signal is determined by means of one TDC in the FPGA and specifies the trigger time. The feedback signal will arrive and be measured somewhat later at the second TDC at the FPGA. The time from the start signal to the feedback signal yields a feedback time. By means of the measurement of the temporal difference between the trigger time and the feedback time, errors resulting from temperature and aging can be compensated for, and the measurement of the distances can be improved.

The invention is based on the object of devising a method and a detection device of the type mentioned in the introduction in which determinations of distances of objects that may be present in the monitoring region can be improved further.

DISCLOSURE OF THE INVENTION

In the case of the method, this object is achieved according to the invention by virtue of the fact that
  at least one first reception start signal is communicated to at least one first receiving unit and at least one second reception start signal is communicated to at least one second receiving unit,
  by means of the at least one first receiving unit in response to the at least one first reception start signal, a reception process that is carried out by the at least one first receiving unit is started and at least one first trigger signal is generated,
  by means of the at least one second receiving unit in response to the at least one second reception start signal, a reception process that is carried out by the at least one second receiving unit is started and at least one second trigger signal is generated,
  a transmitter trigger signal is determined from the at least one first trigger signal and the at least one second trigger signal, which transmitter trigger signal, at least with regard to its trigger function, corresponds to the later of the at least two trigger signals,
  in response to the transmitter trigger signal, at least one optical monitoring signal is generated by at least one optical transmitting unit.

According to the invention, two receiving units are used, which can be read separately from one another. The receiving units can be arranged spatially separately from one another, with the result that the monitoring region can be better monitored. In particular, a larger monitoring region can be covered in this way.

Advantageously, the respective individual monitoring regions of the at least two receiving units can overlap in an overlap region. Gaps in the monitoring region can thus be avoided.

Respective reception processes that are carried out by the respective receiving units are started in response to the reception start signals. The reception processes can advantageously comprise time of flight measurements that can be used to measure times of flight from the transmission of a monitoring signal and the reception of a corresponding reflection monitoring signal from the monitoring region. The distance of a possible object at which the respective monitoring signal was reflected relative to the detection device can be determined from the times of flight. In addition, the reception processes can comprise the determination of directions and/or velocities of objects relative to the detection device.

Overall, the detection device can be configured and used for determining distances, directions and/or velocities of objects relative to the detection device.

In order to ensure that when a monitoring signal is transmitted into the monitoring region, at least in the overlap region, both receiving units are ready to receive, the trigger signal of the receiving unit whose trigger signal is generated later is used for realizing the transmitter trigger signal that starts the generation of the optical monitoring signal. The temporally earlier trigger signal can be discarded in this case.

A transmitter trigger signal is determined from the at least one first trigger signal and the at least one second trigger signal, which transmitter trigger signal, at least with regard to its trigger function, corresponds to the later of the at least two trigger signals. The trigger function within the meaning of the invention, particularly in the case of a digital trigger signal, can be effected by rising edges and/or falling edges.

Advantageously, at least one optical monitoring signal can be generated in response to a rising edge of the transmitter trigger signal. In this case, the rising edge of the transmitter trigger signal, at least with regard to the point in time, corresponds to the rising edge of the later of the at least two trigger signals. Alternatively or additionally, at least one optical monitoring signal can be generated in response to a falling edge of the transmitter trigger signal. In this case, the falling edge of the transmitter trigger signal, at least with regard to the point in time, corresponds to the falling edge of the later of the at least two trigger signals.

The designations "first" or "second" particularly in the case of the receiving units, the reception start signals and the trigger signals or the like, unless mentioned otherwise, serve merely for easier differentiation and do not imply a temporal or other order.

Advantageously, the at least one detection device can operate according to a light time of flight method, in particular a light pulse time of flight method. Optoelectronic detection devices operating according to the light pulse time of flight method can be configured and referred to as time of flight systems (TOF), light detection and ranging systems (LiDAR), laser detection and ranging systems (LaDAR) or the like. In this case, a time of flight is measured from the emission of a monitoring signal, in particular of a light pulse, by at least one transmitting unit and the reception of a reflection monitoring signal originating from the monitoring signal which was reflected at an object in the monitoring region, in particular, by at least one receiving unit. A distance between the detection device and the object at which the monitoring signal was reflected is determined from the time of flight.

Advantageously, the electro-optical detection device can be configured as a scanning system. In this case, a monitoring region can be scanned with optical monitoring signals. For this purpose, the corresponding monitoring signals can be panned over the monitoring region with regard to their propagation direction. In this case, at least one deflection unit, in particular a scanning unit, a deflection mirror unit or the like, can be used.

Advantageously, the electro-optical detection device can be configured as a laser-based distance measuring system. The laser-based distance measuring system can have at least one laser, in particular a diode laser, as the light source of the at least one transmitting unit. The at least one laser can transmit in particular pulsed transmission beams as monitoring signals. The laser can emit optical monitoring signals in frequency ranges that are visible or not visible to the human eye. Accordingly, at least one receiving unit can have a detector designed for the frequency of the emitted light, in particular a point sensor, line sensor or area sensor, in particular an (avalanche) photodiode, a photodiode linear array, a CCD sensor or the like. The electro-optical detection device designed as a laser-based distance measuring system can advantageously be a laser scanner. A laser scanner can scan a monitoring region with an in particular pulsed laser beam.

The invention can be used in the case of a vehicle, in particular a motor vehicle. The invention can advantageously be used in the case of a land-based vehicle, in particular an automobile, a truck, a bus, a motorcycle or the like, an aircraft and/or a watercraft. The invention can also be used in the case of vehicles that can be operated autonomously or at least partially autonomously. However, the invention is not limited to vehicles. It can also be used in stationary operation.

The electro-optical detection device can advantageously be connected to, or part of, at least one in particular electronic control device of the vehicle, in particular a driver assistance system and/or a chassis control system and/or a driver information unit and/or a parking assistance system and/or a gesture recognition system or the like. The vehicle can be operated autonomously or partially autonomously in this way.

The electro-optical detection device can detect stationary or moving objects, in particular vehicles, persons, animals, plants, obstacles, roadway unevennesses, in particular potholes or rocks, roadway boundaries, traffic signs, free spaces, in particular free parking spaces, or the like.

In one advantageous configuration of the method, by means of the reception processes of the receiving units, time of flight measurements can be carried out for at least one optical monitoring signal and at least one corresponding reflection monitoring signal originating from the at least one monitoring signal which was reflected in the monitoring region. In this way, it is possible to determine a time of flight of the optical monitoring signals between the emission of an optical monitoring signal into the monitoring region and the reception of the corresponding reflection monitoring signal from the monitoring region by means of the at least one receiving unit.

An in particular technically dictated delay may occur between the starting of the reception process and the generation of at least one trigger signal by at least one receiving unit. These delays may be different in the case of the at least two receiving units. Different delays upon generation of the trigger signals may be caused on account of the clocking, in particular the synchronization, of signals between the receiving units and a control and evaluation unit. Since the respective temporally later trigger signal is used for starting the at least one optical monitoring signal by means of the optical transmitting unit, the time of flight measurement by means of the at least one receiving unit from which the temporally earlier trigger signal originates is started temporally before the generation of the monitoring signal. In this way, by means of the at least one receiving unit with the earlier trigger signal, erroneously an excessively long time of flight is determined and consequently an excessively large distance is measured. This measurement error can be corrected by means of a distance compensation in the method according to the invention.

In a further advantageous configuration of the method, the at least one first reception start signal can be communicated to the at least one first receiving unit and the at least one second reception start signal can be communicated to the at least one second receiving unit simultaneously. In this way, the reception process by means of the at least one first receiving unit and the reception process by means of the at least one second receiving unit can be started simultaneously.

Advantageously, the at least one first reception start signal and the at least one second reception start signal can be identical. Simultaneity is ensured in this way. Furthermore, only one start signal generating means is required in order to provide the reception start signals.

In a further advantageous configuration of the method, a time of flight measurement which is carried out by means of a reception process by means of the at least one receiving unit which generates the temporally earlier trigger signal can be corrected by means of at least one delay variable, wherein the at least one delay variable characterizes a temporal delay between the at least one first trigger signal of the at least one first receiving unit and the at least one second trigger signal of the at least one second receiving unit. Errors in the distance measurement can be corrected in this way. The distance determinations can thus be further improved.

In a further advantageous configuration of the method, at least one delay variable can be determined which characterizes a temporal delay between that state of the at least one first trigger signal which brings about a trigger function and that state of the at least one second trigger signal which brings about a trigger function. Measurement errors which originate from the temporal delay between the at least one first trigger signal and the at least one second trigger signal can be corrected with the aid of the at least one delay variable.

In a further advantageous configuration of the method,
at least one delay detecting means can be started upon the communication of at least one reception start signal and can be stopped in each case upon the reaching of a state of the at least one first trigger signal which brings about a trigger function and a state of the at least one second trigger signal which brings about a trigger function,
from a difference between a delay for the at least one first trigger signal and a delay for the at least one second trigger signal, at least one delay variable can be determined which characterizes a temporal delay between the at least one first trigger signal and the at least one second trigger signal.

Advantageously, at least one delay detecting means can be realized as a counter. With the aid of a counter, delay variables can be determined in the form of counts. In this regard, digital counts can be determined, too, which can be processed by logic means, in particular.

In a further advantageous configuration of the method, a distance variable characterizing a distance of at least one object at which the at least one optical monitoring signal is reflected relative to the optical detection device can be determined from at least one result of at least one reception process. In this way, the detection device can be used as a distance measuring system.

Advantageously, a direction and/or velocity of at least one object relative to the detection device can additionally be determined from at least one result of at least one reception process. Objects can be assigned better in this way.

Furthermore, in the case of the detection device, the object is achieved according to the invention by virtue of the fact that
the detection device comprises at least two receiving units each having a trigger signal generating means for generating a respective trigger signal,
the control and evaluation unit has at least one start signal generating means for generating reception start signals for the receiving units,
the control and evaluation unit has at least one logic means which can determine a transmitter trigger signal from the trigger signals of the at least two receiving units, which transmitter trigger signal, at least with regard to its trigger function, corresponds to the later of the at least two trigger signals,
wherein the at least one logic means has at least one signal connection to the at least one transmitting unit for communicating at least the transmitter trigger signal for starting the generation of at least one optical monitoring signal.

According to the invention, at least two receiving units are provided which can receive respective reflection monitoring signals separately from one another. The receiving units each have a signal generating means, by which respective trigger signals can be generated separately. The control and evaluation unit has at least one logic means which can generate a transmitter trigger signal corresponding functionally to the temporally later trigger signal. With the transmitter trigger signal, the at least one transmitting unit can be driven and a corresponding optical monitoring signal can thus be generated.

Advantageously, the detection device according to the invention can be configured for carrying out the method according to the invention.

Advantageously, the at least one conversion means for converting optical monitoring signals into signals that can be processed by the control and evaluation unit can have an optoelectronic component.

Advantageously, the at least one conversion means can comprise or consist of a detector designed for the frequency of the emitted monitoring signal, in particular a point sensor, line sensor or area sensor, in particular an (avalanche) photodiode, a photodiode linear array, a CCD sensor or the like. In this way, the optical reflection monitoring signals can be converted into electrical signals. The electrical signals can be processed by an electronic control and evaluation unit.

Advantageously, the control and evaluation unit can be an electronic control and evaluation unit. In this way, the detection device can be operated electronically.

The at least one start signal generating means of the control and evaluation unit and the trigger signal generating means of the receiving units can be realized in a functionally combined fashion. The at least one start signal generating means and/or the trigger signal generating means can be realized by way of software and/or hardware technology. The at least one start signal generating means and the trigger signal generating means can be realized jointly in the control and evaluation unit or spatially separately from one another, in particular in different components.

In one advantageous embodiment, at least one receiving unit can have at least one time of flight measuring means. The at least one time of flight measuring means can determine the time of flight from the generation or transmission of optical monitoring signals through to the reception of the corresponding reflection monitoring signals.

In a further advantageous embodiment, the detection device can have at least one distance compensation means. The at least one distance compensation means can compensate for differences in the distances which are determined by the at least two receiving units. The differences in the measured distances are the consequence of different delays upon the generation of the trigger signals by means of the receiving units.

In a further advantageous embodiment, the detection device can have at least one delay detecting means which can determine a delay variable characterizing a temporal delay between the trigger signals of the at least two receiving units.

Advantageously, at least one delay detecting means can comprise or consist of at least one time-to-digital converter (TDC). A time-to-digital converter can determine at least one digital delay variable which characterizes a temporal delay between the at least one first trigger signal and the at least one second trigger signal.

Advantageously, the at least one delay detecting means can measure a time interval between the respective reception start signal and the generation of the corresponding trigger signal and can convert it into a digital delay variable. The digital delay variable can be fed to a corresponding distance compensation means, which can correct the corresponding measurement errors in the distance measurement of the receiving unit from which the temporally earlier trigger signal originates.

Advantageously, the control and evaluation unit can have at least one distance compensation means and/or at least one delay detecting means. The at least one distance compensation means and/or the at least one delay detecting means can be realized with the control and evaluation unit. In this way, a component outlay can be reduced overall.

In a further advantageous embodiment, at least one delay detecting means can be arranged between an output of at least one receiving unit for the corresponding trigger signal and an input of a distance compensation means. In this way, the delay detecting means can determine a delay variable that characterizes the delay and can feed it directly to the distance compensation means.

In a further advantageous embodiment, at least one logic means can have at least one AND gate, at least one delay line and/or at least one inverter. In this way, after the trigger signals of the at least two receiving units have been input, the transmitter trigger signal can be determined, which transmitter trigger signal, at least with regard to its trigger function, corresponds to the later of the at least two trigger signals.

In the English language, delay lines can also be referred to as "Delay-line".

In a further advantageous embodiment, at least parts of the at least one control and evaluation unit, of the signal generating means, of the distance compensation means, of the delay detecting means, and/or of the logic means can be realized by at least one programmable component. In this way, the corresponding means can be realized and adapted more flexibly.

Advantageously, the at least one programmable component can comprise or consist of at least one Field Programmable Gate Array (FPGA). FPGAs can be adapted in the field, too, by way of corresponding programming.

Moreover, the features and advantages presented in association with the method according to the invention and the detection device according to the invention and the respective advantageous configurations thereof apply in a mutually corresponding manner and vice versa. It goes without saying that the individual features and advantages can be combined among one another, wherein further advantageous effects that go beyond the sum of the individual effects can be established.

BRIEF DESCRIPTION OF THE DRAWINGS

Further advantages, features and details of the invention will become apparent from the following description, in which exemplary embodiments of the invention are explained in greater detail with reference to the drawing. A person skilled in the art will also expediently consider individually the features that have been disclosed in combination in the drawing, the description and the claims and combine them to form meaningful further combinations. Schematically, in the figures

In the figures, identical components are provided with identical reference signs.

EMBODIMENT(S) OF THE INVENTION

Figure 1:
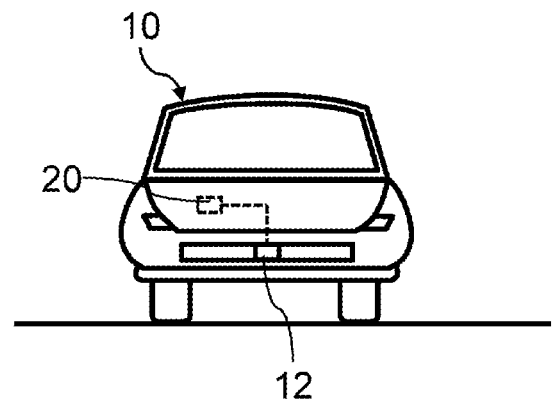
FIG. 1 shows a front view of a vehicle with an optical detection device and a driver assistance system.
Figure 2:
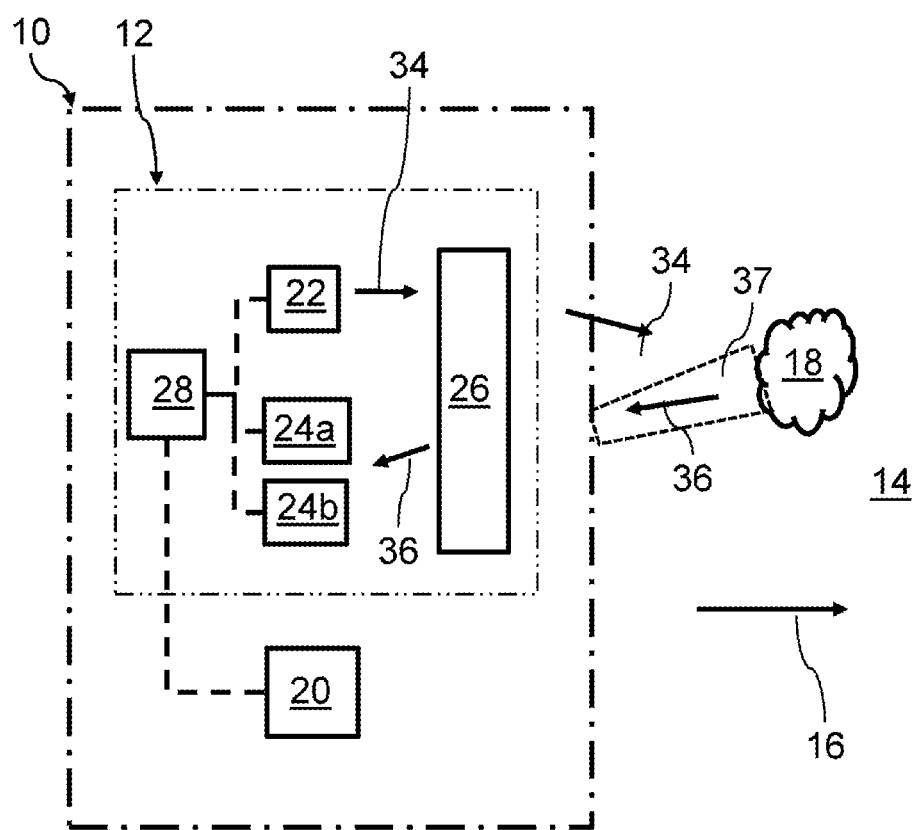
FIG. 2 shows a functional illustration of the vehicle from FIG. 1.

FIG. 1 shows a front view of a vehicle 10 by way of example in the form of an automobile. FIG. 2 illustrates the vehicle 10 as a functional illustration.

The vehicle 10 has an optical detection device 12 by way of example in the form of a laser scanner. The detection device 12 is situated by way of example in the front fender of the vehicle 10 and is directed into a monitoring region 14 by way of example in the direction of travel 16 in front of the vehicle 10. The detection device 12 can also be arranged elsewhere on the vehicle 10 and also with a different orientation. A plurality of detection devices 12 can also be provided. The detection device 12 serves for monitoring the monitoring region 14 for objects 18.

The detection device 12 can detect stationary or moving objects 18, in particular vehicles, persons, animals, plants, obstacles, roadway unevennesses, in particular potholes or rocks, roadway boundaries, traffic signs, free spaces, in particular free parking spaces, or the like. The detection device 12 can determine at least distances, but also directions and/or velocities of objects 18 relative to the vehicle 10.

Furthermore, the vehicle 10 has a driver assistance system 20. The vehicle 10 can be operated autonomously or partially autonomously with the aid of the driver assistance system 20. The detection device 12 is functionally connected to the driver assistance system 20. Via the connection, information detected by the detection device 12 from the monitoring region 14, for example about possible objects 18, can be communicated to the driver assistance system 20.

Figure 3:
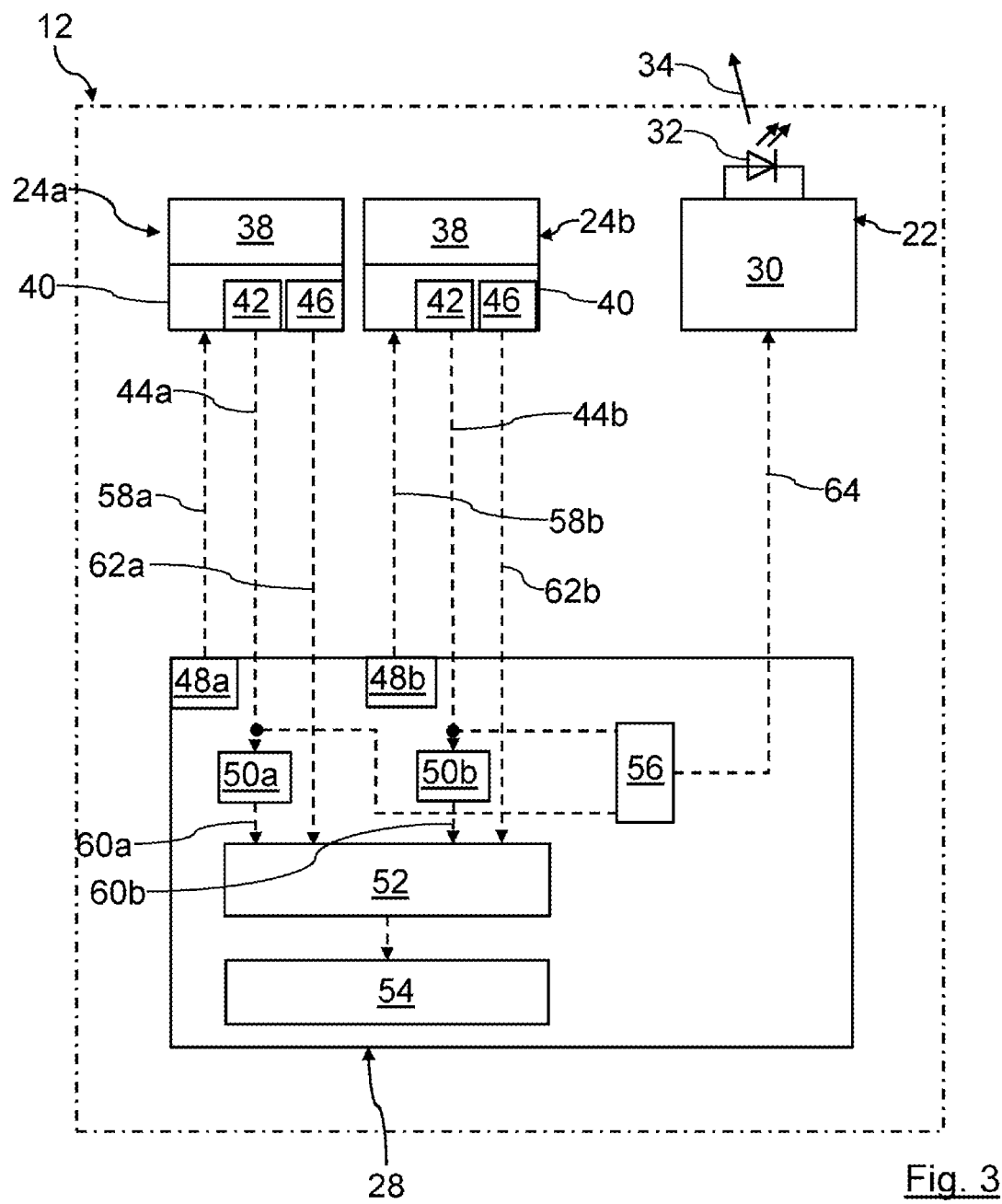
FIG. 3 shows a functional illustration of the optical detection device from FIG. 1.

The detection device 12 is shown as a functional illustration in FIG. 3 as well. The detection device 12 comprises by way of example a transmitting unit 22, two receiving units 24*a* and 24*b*, a light signal deflection unit 26 and a control and evaluation unit 28.

The transmitting unit 22 has transmitting electronics 30 and a light source 32. The light source 32 is realized by way of example as a laser diode. The transmitting unit 22 is connected to the control and evaluation unit 28 functionally, for example for control and power supply purposes. Optical monitoring signals 34, for example in the form of laser pulses, can be generated by the transmitting unit 22, or respectively the light source 32.

The transmitting unit 22 can optionally have a transmitter optical element, not shown, which can expand the optical monitoring signals 34 for example in a spatial direction transversely with respect to the propagation direction of the monitoring signals 34. The transmitting unit 22 is directed at the light signal deflection unit 26. The monitoring signals 34 are transmitted to the light signal deflection unit 26 by the transmitting unit 22.

The light signal deflection unit 26 can have for example a driven deflection mirror, for example a micro-oscillating mirror or MEMS mirror. The optical monitoring signals 34 are directed into the monitoring region 14 by the light signal deflection unit 26. In this case, the directions of the monitoring signals 34 can be changed by the deflection mirror being pivoted, for example. The monitoring region 14 can thus be scanned with the optical monitoring signals 34.

If the optical monitoring signals 34 impinge on an object 18 in the monitoring region 14, they are reflected and returned. The reflected monitoring signals 34 are referred to as reflection monitoring signals 36 for the sake of easier differentiability.

The reflection monitoring signals 36 impinging on the light signal deflection unit 26 are deflected by the latter to the receiving units 24a and 24b. The field of view of the receiving unit 24a and the field of view of the receiving unit 24b overlap in the monitoring region 14 in an overlap region 37, indicated by a dashed trapezoid in FIG. 2. Reflection monitoring signals 36 from the overlap region 37 are received by both receiving units 24a and 24b.

The receiving units 24a and 24b are configured functionally identically, by way of example. Each of the receiving units 24a and 24b comprises an optoelectronic receiving component 38, by way of example an optical detector, for example a point sensor, line sensor or area sensor, in particular an (avalanche) photodiode, a photodiode linear array, a CCD sensor or the like. The optical reflection monitoring signals 36 can be converted into corresponding electrical monitoring signals by the optoelectronic receiving component 38.

Furthermore, each receiving unit 24a and 24b has receiving electronics 40. The receiving electronics 40 are in each case connected to the control and evaluation unit 28 in terms of signaling. For example, electrical signals can be communicated to the receiving units 24a and 24b by the control and evaluation unit 28, and vice versa. Furthermore, the electrical monitoring signals or object information resulting therefrom, such as distance variables 62a and 62a, for example, can be transferred from the receiving units 24a and 24b to the control and evaluation unit 28.

Moreover, the receiving electronics 40 in each case comprise a trigger signal generating means 42 and a time of flight means 46.

Trigger signals 44a can be generated by the trigger signal generating means 42 of the receiving unit 24a. Trigger signals 44b can be generated by the trigger signal generating means 42 of the receiving unit 24b.

The time of flight means 46 can determine the respective times of flight from the emission of the monitoring signals 34 until the reception of the reflection monitoring signals 36 by the respective receiving units 24a and 24b and can determine corresponding distance variables 62a and 62b from the times of flight. The distance variable 62a characterizes the distance of the object 18 determined by the receiving unit 24a. The distance variable 62b characterizes the distance of the object 18 determined by the receiving unit 24b. In general, distance variables 62a and 62b of different magnitudes are determined by the receiving units 24a and 24b, as explained in greater detail further below.

The receiving electronics 40 and the control and evaluation unit 28 can be realized by way of software and/or hardware technology.

The control and evaluation unit 28 can be configured as a so-called Field Programmable Gate Array (FPGA), for example. The control and evaluation unit 28 comprises by way of example two start signal generating means 48, two delay detecting means 50a and 50b, a distance compensation means 52, a storage means 54 and a logic means 56.

The start signal generating means 48a can generate a reception start signal 58a and communicate it to the receiving unit 24a. Correspondingly, the start signal generating means 48b can generate a reception start signal 58b and communicate it to the receiving unit 24b.

A digital delay variable characterizing a temporal delay 60a between the reception start signal 58a and the corresponding trigger signal 44a can be realized by the delay means 50a of the receiving unit 24a. A digital delay variable characterizing a temporal delay 60b between the reception start signal 58b and the corresponding trigger signal 44b can be realized by the delay means 50b of the receiving unit 24b. The temporal delays 60a and 60b, or respectively the corresponding delay variables, can be fed to the distance compensation means 52. The delay means 50a and 50b can be realized as delay counters, for example.

With the aid of the two distance variables 62a and 62b and the two temporal delays 60a and 60b, the distance compensation means 52 can carry out a correction of the determined distances, for example of one of the determined distance variables 62a or 62b. The corrected distances, or respectively the possibly corrected distance variables 62a or 62b, can be stored in the storage means 54, from where the data can be retrieved as necessary. The storage means 54 can be realized as RAM, for example.

Figure 5:
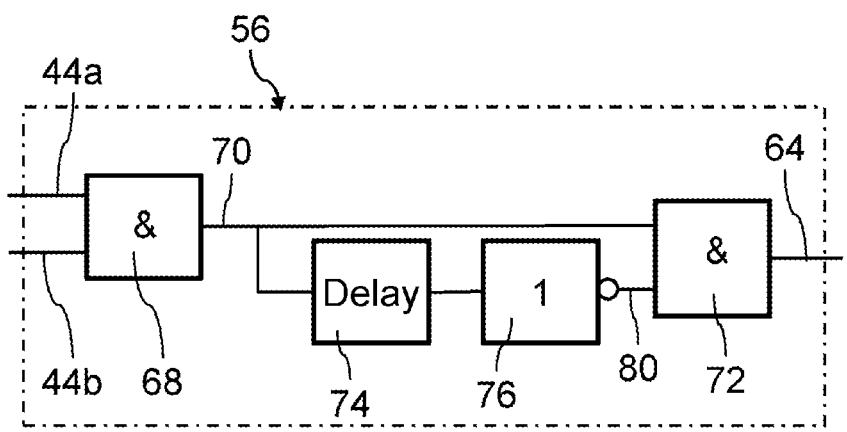
FIG. 5 shows a functional illustration of a logic means that is part of a control and evaluation unit of the optical detection device from FIGS. 1 to 3.

The logic means 56 is shown in detail in FIG. 5. The logic means 56 can determine a transmitter trigger signal 64 from the temporally later of the two trigger signals 44a and 44b. The transmitter trigger signal 64 can be communicated to the transmitting unit 22, or respectively the transmitting electronics 30. In response to the transmitter trigger signal 64, an optical monitoring signal 34 is generated by the light source 32.

Figure 4:
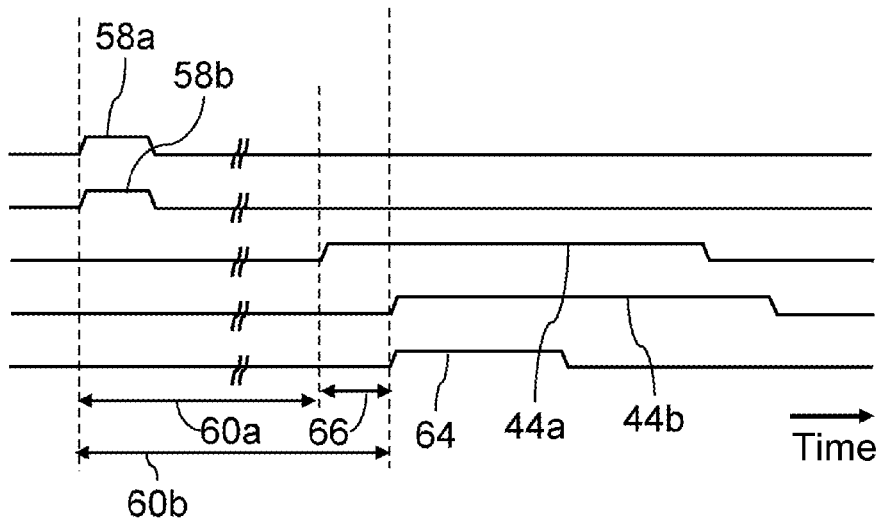
FIG. 4 shows temporal profiles of control signals of the optical detection device.

FIG. 4 shows the time profiles of the reception start signals 58a and 58b, of the trigger signals 44a and 44b and of the transmitter trigger signal 64. The illustration is not to scale. The reception start signals 58a and 58b, the trigger signals 44a and 44b and the transmitter trigger signal 64 are digital signals by way of example. The beginning of the reception start signals 58a and 58b, of the trigger signals 44a and 44b and of the transmitter trigger signal 64 is realized by a respective rising edge and the end of said signals is realized by a respective falling edge.

The method for operating the detection device 12 involves firstly determining the position of the light signal deflection unit 26 and thus the direction in which the monitoring region 14 is scanned by the detection device 12.

As soon as the light signal deflection unit 26 is directed into the overlap region 37 of the two receiving units 24a and 24b, a corresponding signal is communicated to the control and evaluation unit 28.

In response to this signal, the start signal generating means 48a and 48b of the control and evaluation unit 28 generate the respective reception start signals 58a and 58b and communicate them to the receiving units 24a and 24b. The reception start signals 58a and 58b are ideally communicated simultaneously. Instead of the for example two start signal generating means 48a and 48b, a single start signal generating means can also be provided, which can be connected to both receiving units.

In response to the reception start signal 58a, a reception process comprising a time of flight with the aid of the time of flight means 46 is started in the receiving unit 24a. Moreover, the respective trigger signal 44a is generated by the trigger signal generating means 42 of the receiving unit 24a with a delay 60a.

In response to the reception start signal 58b, a reception process comprising a time of flight measurement with the aid of the time of flight means 46 in the receiving unit 24b is started in said receiving unit. Moreover, the respective trigger signal 44b is generated by the trigger signal generating means 42 of the receiving unit 24b with a delay 60b.

The delay 60a of the receiving unit 24a and the delay 60b of the receiving unit 24b differ by a difference 66. In the exemplary embodiment described, the differences in the delays 60a and 60b stem from the fact that there is no synchronism of the clock signal cycles between the control and evaluation unit 28, the receiving unit 24a and the receiving unit 24b. An expected difference 66 between the delay times 60a and 60b is a few nanoseconds, for example. The difference 66 is determined with the aid of the delay detecting means 50a and 50b, as explained further below. The clock signal cycles of the delay detecting means 50a and 50b are higher than the clock signal cycles of the receiving units 24a and 24b by a multiple.

The trigger signal 44a of the receiving unit 24a is communicated to the delay detecting means 50a. The trigger signal 44b of the receiving unit 24b is communicated to the delay detecting means 50b. Both trigger signals 44a and 44b are additionally fed to the logic means 56.

The delay detecting means 50a is started by the reception start signal 58a and stopped when the trigger signal 44a arrives. The temporal delay 60a is determined by the delay detecting means 50a. Correspondingly, the delay detecting means 50b is started by the reception start signal 58b and stopped when the trigger signal 44b arrives. The temporal delay 60b is determined by the delay detecting means 50b.

The logic means 56 is shown in detail in FIG. 5. The logic means 56 has for example a first AND gate 68, to the inputs of which the trigger signals 44a and 44b are applied. A first AND gate output signal 70 at the output of the first AND gate 68 is applied to an input of a second AND gate 72. In addition, the first AND gate output signal 70 is applied to an input of a delay line 74. The delay line 74 is followed by an inverter 76.

The inverted delay line output signal 80 at the output of the inverter 76 is applied to the second input of the second AND gate 72. The transmitter trigger signal 64 is present at the output of the second AND gate 72. The rising edge of the transmitter trigger signal 64 corresponds to the rising edge of the temporally later trigger signal, for example of the trigger signal 44b of the receiving unit 24b. In the example described, the rising edge of the transmitter trigger signal 64 fulfills the trigger function for generating a monitoring signal 34 by means of the transmitting unit 22. This means that the light source 32 is triggered by the rising edge of the transmitter trigger signal 64 for the generation of a monitoring signal 34.

Figure 6:
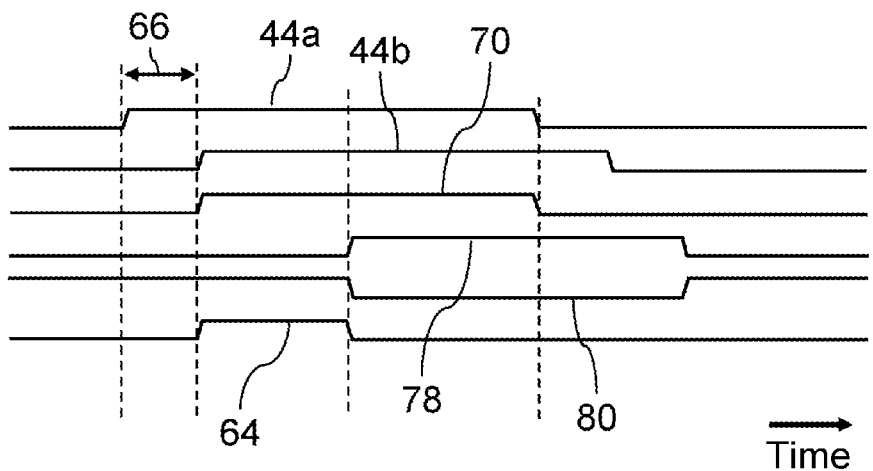
FIG. 6 shows temporal profiles of signals within the logic means from FIG. 5.

The temporal profiles of the trigger signals 44a and 44b, of the AND gate output signal 70, of a delay line output signal 78, of the inverted delay line output signal 80 and of the transmitter trigger signal 64 are shown, not to scale, in FIG. 6. The delay line output signal 78 is present at the output of the delay line 74.

By way of example, the difference 66 in the delays 60a and 60b between the two trigger signals 44a and 44b can be shorter than 5 ns. The duration of the trigger signals 44a and 44b, namely the temporal interval between the respective rising edge and the respective falling edge, is of the order of magnitude of approximately 80 ns. The trigger signals 44a and 44b are significantly greater than the difference 66 between the delays 60a and 60b. In this way, double pulses cannot occur at the output of the second AND gate 72. The delay line 74 can effect adaptation to the desired length of the transmitter trigger signal 64.

Overall, the temporally later trigger signal, the trigger signal 44b in the example shown, is not converted into the time base of the control and evaluation unit 28, but rather forwarded via the non-clocked elements of the logic means 56 in the form of the transmitter trigger signal 64 to the transmitting unit 22.

In response to the transmitter trigger signal 64, an optical monitoring signal 34 is generated by the transmitting unit 22. With the aid of the light signal deflection unit 26, which, as mentioned initially, is currently directed into the overlap region 37, the optical monitoring signal 34 is transmitted into the monitoring region 14.

The reflection monitoring signal 36 reflected at the object 18 in the overlap region 37 is directed onto both receiving units 24a and 24b by the light signal deflection unit 26. With the reception of the reflected reflection monitoring signals 36, the respective times of flight are determined.

Since the receiving unit 24a, which generates the temporally earlier trigger signal 44a in the example described, begins the time of flight measurement before the corresponding reflection monitoring signal 36 has been generated by the light source 32, an excessively long time of flight and thus an excessively large distance are erroneously measured. The difference between the measured time of flight and the correct time of flight corresponds to the difference 66 between the two trigger signals 44a and 44b.

From the temporal delays 60a and 60b and the distance variables 62a and 62b communicated by the two receiving units 24a and 24b, the distance compensation means 52 corrects that distance variable which is determined by the receiving unit which makes available the temporally earlier trigger signal. In the exemplary embodiment described, the receiving unit 24a makes available the temporally earlier trigger signal 58a, such that the corresponding distance variable 62a is corrected. The other distance variable 62b is assumed to be correct and is not corrected.

The distance variable 62b and the corrected distance variable 62a are communicated to the storage means 54. In the storage means 54, the corresponding distance information items, namely the distance variable 62b and the corrected distance variable 62a, are available upon retrieval for example by the driver assistance system 20.

The invention claimed is:

1. A method for operating an optoelectronic detection device for monitoring at least one monitoring region with optical monitoring signals, the method comprising:
   transmitting reception start signals to optical receivers,
      wherein the optical receivers comprise at least one first optical receiver and at least one second optical receiver, wherein the reception start signals comprise at least one first start signal and at least one second start signal, and wherein the at least one first start signal is transmitted to at least one first optical receiver and the at least one second start signal is transmitted to the at least one second start signal;

starting reception processes, by the optical receivers in response to the reception start signals and generating trigger signals, wherein the reception processes comprise a first reception process and a second reception process, wherein the reception start signals comprise at least one first reception start signal and at least one second reception start signal, wherein the trigger signals comprise at least one first trigger signal and at least one second trigger signal, wherein the first reception process:
is started by the at least one first optical receiver in response to at least one first reception start signal and
generates the at least one first trigger signal, wherein the second reception process:
is started by the at least one second optical receiver in response to at least one second reception start signal and
generates the at least one second trigger signal;

generating, in response to the trigger signals directly or indirectly by at least one optical transmitter, the optical monitoring signals and transmitting the optical monitoring signals into the at least one monitoring region;

receiving reflection monitoring signals originating from the optical monitoring signals reflected in the at least one monitoring region by the optical receivers;

determining a transmitter trigger signal, by at least one logic circuit, from the at least one first trigger signal and the at least one second trigger signal, wherein the transmitter trigger signal, the at least one first trigger signal, and the at least one second trigger signal have similar trigger functions;

in response to the transmitter trigger signal, the optical monitoring signals are generated by the at least one optical transmitter;

measuring, by time-of-flight calculators of the optical receivers, times of flight from emission of the optical monitoring signals and reception of the reflection monitoring signals which are reflected by at least one object in the at least one monitoring region; and determining a distance, by the time-of-flight calculators of the optical receivers, between the optoelectronic detection device and the at least one object based on the measured times of flight.

2. The method as claimed in claim 1, wherein the reception processes by the optical receivers carries out time of flight measurements for the optical monitoring signals and the reflection monitoring signals.

3. The method as claimed in claim 1, wherein the at least one first reception start signal is transmitted to the at least one first receiver and the at least one second reception start signal is transmitted to the at least one second receiver simultaneously.

4. The method as claimed in claim 1, wherein a time of flight measurement is carried out during the first reception process by the first optical receiver which generates a temporally earlier first trigger signal corrected by at least one delay variable, wherein the at least one delay variable characterizes a temporal delay between the at least one first trigger signal of the at least one first optical receiver and the at least one second trigger signal of the at least one second optical receiver.

5. The method as claimed in claim 1, wherein at least one delay variable is determined which characterizes a temporal delay between a state of the at least one first trigger signal which brings about a first trigger function and a state of the at least one second trigger signal which brings about a second trigger function.

6. The method as claimed in claim 1, wherein
delay detectors are started upon transmission of the reception start signals and are stopped in each case upon reaching a state of the at least one first trigger signal which brings about a first trigger function and a state of the at least one second trigger signal which brings about a second trigger function, and
from a difference between a first delay for the at least one first trigger signal and a second delay for the at least one second trigger signal, at least one delay variable is determined which characterizes a temporal delay between the at least one first trigger signal and the at least one second trigger signal.

7. The method as claimed in claim 1, wherein distance variables characterizing a distance of the at least one object at which the optical monitoring signals are reflected relative to the optoelectronic detection device is determined from at least one result of the reception processes.

8. An optoelectronic detection device for monitoring at least one monitoring region with optical monitoring signals, the optoelectronic detection device comprising:
at least one optical transmitter for generating the optical monitoring signals;
optical receivers for receiving reflection monitoring signals originating from the optical monitoring signals reflected in the at least one monitoring region;
at least one Field Programmable Gate Array (FPGA) which controls the optoelectronic detection device and evaluates information about the at least one monitoring region detected by the optoelectronic detection device,
wherein the at least one FPGA is connected to the optical receivers and the at least one optical transmitter at least in terms of signalling,
wherein the at least one FPGA has start signal generators for generating reception start signals for the optical receivers,
wherein the optical receivers has at least one trigger signal generator for generating trigger signals,
wherein the optical receivers has at least one photodiode for converting optical reflection monitoring signals into signals that can be processed by the at least one FPGA, and
wherein the at least one optical transmitter has at least one light source which can generate the optical monitoring signals; and
the optical receivers each having a trigger signal generator for generating a respective trigger signal,
wherein the at least one FPGA has:
start signal generators for generating reception start signals for the optical receivers,
at least one logic circuit which determines a transmitter trigger signal from the trigger signals of the optical receivers, wherein the transmitter trigger signal and the trigger signals have similar trigger functions,
wherein the at least one logic circuit has at least one signal connection to the at least one optical transmitter for communicating at least the transmitter trigger signal for starting the generation of the optical monitoring signals;

wherein time-of-flight calculators of the optical receivers measure times of flight from emission of the optical monitoring signals and reception of the reflection monitoring signals which are reflected by at least one object in the at least one monitoring region; and wherein the time-of-flight calculators of the optical receivers measure a distance between the optoelectronic detection device and the at least one object based on the measured times of flight.

9. The optoelectronic detection device as claimed in claim 8, wherein the optical receivers has at least one time of flight calculator.

10. The optoelectronic detection device as claimed in claim 8, wherein the optoelectronic detection device has at least one distance compensator.

11. The optoelectronic detection device as claimed in claim 8, wherein the optoelectronic detection device has delay detectors which can determine a delay variable characterizing a temporal delay between the trigger signals of the optical receivers.

12. The optoelectronic detection device as claimed in claim 8, wherein delay detectors are arranged between outputs of the optical receivers for the trigger signals and an input of at least one distance compensator.

13. The optoelectronic detection device as claimed in claim 8, wherein the at least one logic circuit has at least one AND gate, at least one delay line and/or at least one inverter.

14. The optoelectronic detection device as claimed in claim 8, wherein at least parts of the at least one FPGA, of the start signal generators, of at least one distance compensator, of delay detectors, and/or of the at least one logic circuit are realized by the at least one FPGA.

* * * * *